US009593935B2

(12) United States Patent
Osawa et al.

(10) Patent No.: US 9,593,935 B2
(45) Date of Patent: Mar. 14, 2017

(54) OPTICAL IMAGE MEASURING APPARATUS

(71) Applicant: Hitachi-LG Data Storage, Inc., Tokyo (JP)

(72) Inventors: Kentaro Osawa, Tokyo (JP); Naoko Senda, Tokyo (JP); Daisuke Tomita, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/795,289

(22) Filed: Jul. 9, 2015

(65) Prior Publication Data
US 2016/0054113 A1 Feb. 25, 2016

(30) Foreign Application Priority Data

Aug. 20, 2014 (JP) ................. 2014-167295

(51) Int. Cl.
*G01B 9/02* (2006.01)
*G06T 5/50* (2006.01)
*G01J 3/02* (2006.01)

(52) U.S. Cl.
CPC ..... *G01B 9/02091* (2013.01); *G01B 9/02058* (2013.01); *G01B 9/02063* (2013.01);
(Continued)

(58) Field of Classification Search
CPC ............ G01B 9/02058; G01B 9/02063; G01B 9/02081; G01B 9/02083; G01B 9/02087;
(Continued)

(56) References Cited

U.S. PATENT DOCUMENTS

2007/0238955 A1* 10/2007 Tearney ............. A61B 1/00096
600/407
2009/0296542 A1* 12/2009 Miyamoto ......... G11B 7/08523
369/44.11
(Continued)

OTHER PUBLICATIONS

Extended European Search Report received in corresponding European Application No. 15001829.9 dated Jan. 13, 2016.
(Continued)

*Primary Examiner* — Sunghee Y Gray
(74) *Attorney, Agent, or Firm* — Mattingly & Malur, PC

(57) ABSTRACT

A clear image of a measurement target in optical coherence tomography (OCT) is obtained while suppressing influence of reflected light from a specific portion. Included are a laser beam source, a beam splitter that splits a laser beam into a signal beam and reference beam; an objective lens that focuses the signal beam onto a measurement target in a container, a unit that moves the signal beam focus position, an objective lens that focuses the reference beam, a reflecting mirror, a flat plate arranged between the objective lens and reflecting mirror, and interference optics that combine the signal beam reflected by the measurement target with the reference beam reflected by the reflecting mirror and having passed through the objective lens. Three or more interference beams with different phases, and photodetectors that detect the interference beams are generated, and two of the objective lenses are the same lenses.

8 Claims, 9 Drawing Sheets

(52) U.S. Cl.
CPC ..... *G01B 9/02081* (2013.01); *G01B 9/02083* (2013.01); *G01B 9/02087* (2013.01); *G01J 3/0289* (2013.01); *G06T 5/50* (2013.01); *G06T 2207/10101* (2013.01); *G06T 2207/20224* (2013.01)

(58) Field of Classification Search
CPC ............... G01B 9/02091; G01J 3/0289; G06T 2207/10101; G06T 2207/20224; G06T 5/50
USPC ......................................................... 356/450
See application file for complete search history.

(56) References Cited

U.S. PATENT DOCUMENTS

| | | | |
|---|---|---|---|
| 2010/0195876 A1* | 8/2010 | Artal Soriano | A61B 3/1176 382/128 |
| 2011/0310395 A1* | 12/2011 | Tsai | G01B 9/02091 356/479 |
| 2012/0300217 A1 | 11/2012 | Yuasa | |
| 2013/0120614 A1* | 5/2013 | Oyama | H04N 5/2351 348/234 |
| 2014/0029405 A1* | 1/2014 | Kurokawa | G11B 20/10481 369/107 |
| 2014/0204388 A1 | 7/2014 | Osawa et al. | |

OTHER PUBLICATIONS

Binding, J. et al., "Brain Refractive Index Measured in Vivo with High-NA Defocus-Corrected Full-Field OCT and Consequences for Two-Photon Microscopy", Optics Express, Mar. 14, 2011, pp. 4833-4847, vol. 19, No. 6.

Subhash, H. M., "Full-Field and Single-Shot Full-Field Optical Coherence Tomography: A Novel Technique for Biomedical Imaging Applications", Advances in Optical Technologies, Jan. 1, 2012, pp. 205-226, vol. 1315, No. 3.

Labiau, S. et al., "Defocus Test and Defocus Correction in Full-Field Optical Coherence Tomography", Optics Letters, May 15, 2009, pp. 1576-1578, vol. 34, No. 10.

* cited by examiner z=0μm z=5μm

Original image at z = 5 μm

Afterimage of xy image at z = 0 μm

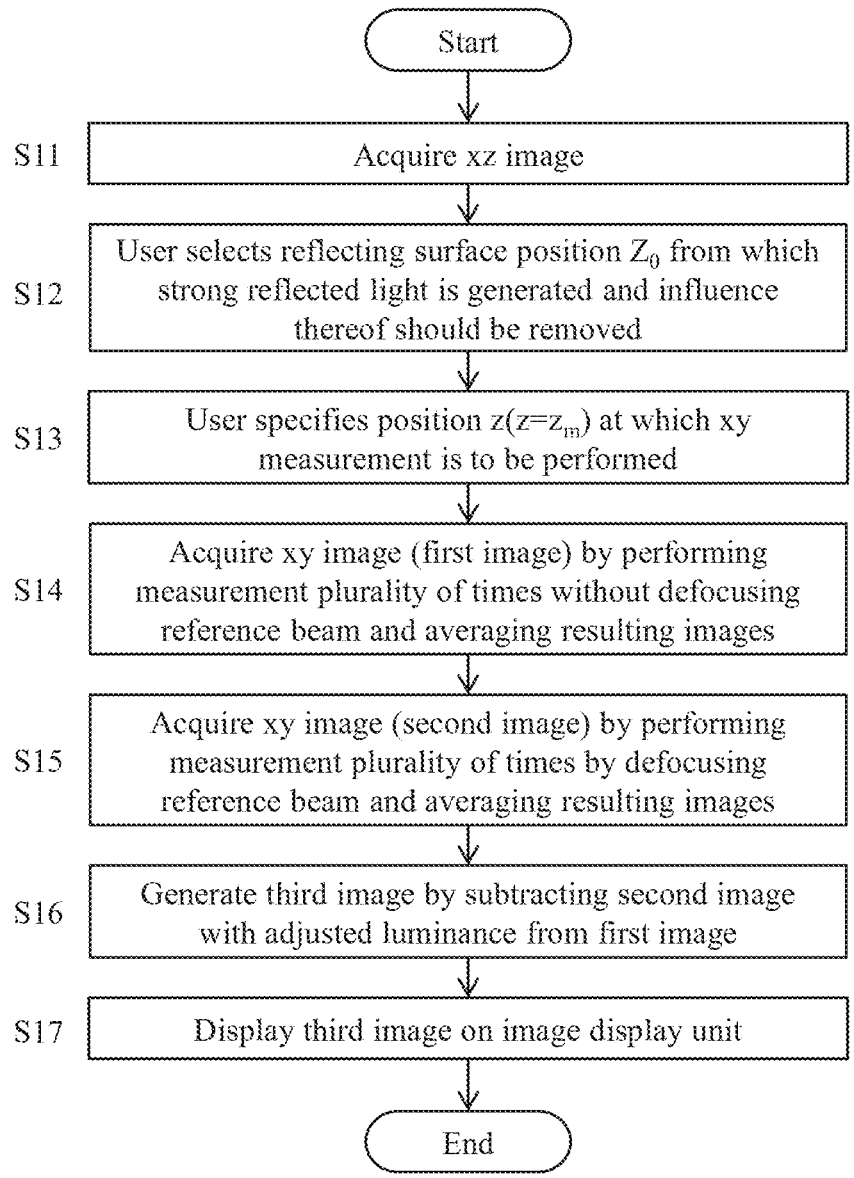

OPTICAL IMAGE MEASURING APPARATUS

CLAIM OF PRIORITY

The present application claims priority from Japanese patent application JP 2014-167295 filed on Aug. 20, 2014, the content of which is hereby incorporated by reference into this application.

BACKGROUND

Technical Field

The present invention relates to an optical image measuring apparatus for observing a measurement target using interference of light beams.

Background Art

In recent years, optical coherence tomography (OCT) has been drawing attention that acquires an image of the surface structure or the inner structure of a measurement target using interference of light beams. The OCT has already been put into practical use in funduscopy. In recent years, application of the OCT to imaging of cultured cells is also considered with a view to conduct inspection of transplanted tissue in regenerative medicine and the like.

In the OCT, as described in Patent Document 1, for example, a light beam from a light source is split into two: a signal beam to irradiate a measurement target and a reference beam to be reflected by a reference beam mirror without irradiating the measurement target. Then, the signal beam reflected by the measurement target is combined with and thus is caused to interfere with the reference beam, whereby an interference signal is obtained.

The OCT is broadly divided into the time domain OCT and the Fourier domain OCT depending on the method of moving the measurement position in the optical axis direction (hereinafter referred to as z-scan). In the time domain OCT, z-scan is performed by using a low coherence light source as a light source and moving a reference beam mirror during measurement. Accordingly, only the components in a signal beam that have the same optical path length as the reference beam interfere with the reference beam. When the obtained interference signal is subjected to envelope detection, a desired signal is obtained through demodulation. Meanwhile, the Fourier domain OCT is further divided into the wavelength-scanning OCT and the spectral domain OCT. In the wavelength-scanning OCT, z-scan is performed by using a wavelength-scanning light source capable of causing the wavelength of an emitted beam to scan, and causing the wavelength to scan during measurement. When Fourier transform is performed on the wavelength dependence of the detected interference beam intensity (i.e., interference spectrum), a desired signal is obtained. In the spectrum domain OCT, a broadband light source is used for a light source, and the following corresponds to the z-scan: splitting the generated interference beam using a beam splitter, and detecting the interference beam intensity (i.e., interference spectrum) for each wavelength component. When Fourier transform is performed on the obtained interference spectrum, a desired signal is obtained.

RELATED ART DOCUMENTS

Patent Documents

Patent Document 1: US 2012/0300217 A1

SUMMARY

When body tissue, cells, and the like are measured with the OCT, reflected light from the inside of a measurement target is typically far weaker than reflected light from the surface of the measurement target and reflected light from the interface between the measurement target and a measurement target holding portion, such as cover glass or a cell culture vessel. For example, a case will be described where a cell in a culture vessel, which is filled with a culture solution, is measured as shown in FIG. 1. The refractive index of a typical culture vessel (made of polystyrene) is about 1.59, and the refractive index of the cell is about 1.37. From such values, the reflectivity of the interface between the culture vessel and the cell is estimated to be about 0.55%. Meanwhile, for example, provided that the refractive index of the culture solution is about 1.33, the reflectivity of the interface between the cell and the culture solution is about 0.022%. Thus, it is found that reflected light from the cell is weaker than reflected light from the interface between the culture vessel and the cell by one digit or more. The reflectivity of the interface between different cells and the reflectivity of the inside of the cell is considered to be even smaller than 0.022%.

As described above, as reflected light from the surface of the measurement target or from the interface between the measurement target and the measurement target holding portion is far stronger than reflected light from the inside of the measurement target, there is a problem in that crosstalk would occur when the inside of the measurement target is imaged with the OCT, which can result in image degradation. A specific example of image degradation due to reflected light from the interface between the measurement target and the measurement target holding portion is shown in FIGS. 2A and 2B. FIGS. 2A and 2B are schematic diagrams of xy images (i.e., tomographic images in a direction perpendicular to the optical axis) at $z=0$ μm and $z=5$ μm, respectively, shown in FIG. 1 obtained with the OCT. An xy image at $z=0$ μm appears as an afterimage in the xy image at $z=5$ μm. As described above, the influence of reflected light from the interface between the measurement target and the measurement target holding portion appears in the xy image of the inside of the measurement target as an afterimage of the structure of the interface between the measurement target and the measurement target holding portion.

As a means for removing the afterimage, a method of subtracting the xy image at $z=0$ μm with adjusted luminance from the xy image of the inside of the measurement target is considered. Such a method is considered to work in the conventional OCT in which the measurement position in the z direction is changed or moved by moving a reference beam mirror or sweeping the wavelength. However, as the conventional OCT uses an objective lens with low NA (typically, a NA of less than or equal to 0.1), the xy resolution is about 20 to 30 μm. Thus, it would be impossible to image a small structure with a size of about 10 μm like a cultured cell.

Thus, in order to obtain a high spatial resolution, the inventors studied a configuration in which a tomographic image of a measurement target is acquired by applying a laser light source with a long coherence length as a light source, causing a laser beam (i.e., signal beam) to be focused onto and irradiate the measurement target using an objective lens with high NA, and moving the objective lens to move the focus position. When an OCT apparatus with such a configuration is used, a signal beam at $z=0$ μm for when the inside of the measurement target is measured is defocused. Thus, a defocused xy image at $z=0$ μm appears as an afterimage in an xy image of the inside of the measurement target. Thus, a method of subtracting the xy image at $z=0$ μm with adjusted luminance from the xy image of the inside of the measurement target has a problem in that an afterimage that is generated due to reflected light from z=0 μm cannot be accurately removed as the aforementioned defocus is not taken into consideration.

An optical image measuring apparatus according to the present invention includes a light source configured to emit a laser beam; a beam splitter configured to split the laser beam emitted from the light source into a signal beam and a reference beam; a first objective lens configured to focus the signal beam onto a measurement target in a container to irradiate the measurement target with the signal beam; a focus position moving unit configured to move a focus position of the signal beam; a second objective lens configured to focus the reference beam; a reflecting mirror configured to reflect the reference beam that has passed through the second objective lens and return the reference beam to the second objective lens; a flat plate arranged between the second objective lens and the reflecting mirror; interference optics configured to combine the signal beam reflected or scattered by the measurement target with the reference beam that has been reflected by the reflecting mirror and has passed through the second objective lens, thereby generating three or more interference beams with different phases; and a photodetector configured to detect the interference beams. Herein, the second objective lens is the same objective lens as the first objective lens, and the flat plate has the same material and the same thickness as a portion, which transmits the signal beam, of the container.

The optical image measuring apparatus further includes an image generation unit configured to generate an image on the basis of a signal obtained from the photodetector for each focus position of the signal beam moved by the focus position moving unit, and an image processing unit configured to perform a subtraction process between two images generated by the image generation unit.

An optical image measuring method in accordance with the present invention is an optical image measuring method for splitting a laser beam into a signal beam and a reference beam, focusing the signal beam onto a measurement target to irradiate the measurement target with the signal beam, causing the signal beam reflected or scattered by the measurement target to interfere with the reference beam, thereby generating three or more interference beams with different phases, and acquiring a tomographic image of the measurement target on the basis of detection signals of the interference beams, the method including acquiring a first image on the basis of a detection signal obtained by moving a focus position of the signal beam in a direction perpendicular to an optical axis while using a plane wave as the reference beam; acquiring a second image on the basis of a detection signal obtained by moving the focus position of the signal beam in the direction perpendicular to the optical axis by providing a defocus aberration to the reference beam; and generating a third image by performing at least a subtraction process between the first image and the second image.

The step of generating the third image can be performed by subtracting the second image with adjusted luminance from the first image.

The amount of defocus aberration can be set such that, from one aspect, crosstalk that has appeared on the first image can be removed or reduced in the third image.

An optical image measuring apparatus in accordance with the present invention includes a light source configured to emit a laser beam; a beam splitter configured to split the laser beam emitted from the light source into a signal beam and a reference beam; an objective lens configured to focus the signal beam onto a measurement target to irradiate the measurement target with the signal beam; a focus position moving unit configured to move a focus position of the signal beam; a defocus aberration adjustment unit configured to adjust a defocus aberration of the reference beam; interference optics configured to combine the signal beam reflected or scattered by the measurement target with the reference beam, thereby generating three or more interference beams with different phases; a photodetector configured to detect the interference beams; an image generation unit configured to generate an image on the basis of output signals of the photodetector; and an image processing unit configured to apply image processing to the image generated by the image generation unit. Specifically, the image processing unit is configured to generate a third image by performing at least a subtraction process between a first image and a second image, the first image having been generated by the image generation unit by not providing a defocus aberration to the reference beam, and the second image having been generated by the image generation unit by providing a defocus aberration to the reference beam.

The third image is generated by subtracting the second image with adjusted luminance from the first image with the image processing unit.

The optical image measuring apparatus further includes a beam splitter configured to split the reference beam into a first reference beam and a second reference beam, the first reference beam not passing through the defocus aberration adjustment unit and the second reference beam passing through the defocus aberration adjustment unit; first interference optics and second interference optics as the interference optics. The first interference optics are configured to generate interference beams of the signal beam reflected or scattered by the measurement target and the first reference beam. The second interference optics are configured to generate interference beams of the signal beam reflected or scatted by the measurement target and the second reference beam. An image generated by the image generation unit on the basis of output signals of a photodetector configured to detect the interference beams of the first interference optics is used as the first image, and an image generated by the image generation unit on the basis of output signals of a photodetector configured to detect the interference beams of the second interference optics is used as the second image.

According to the present invention, an optical image measuring apparatus can be provided that can suppress influence of strong reflected light generated from a specific reflecting surface, such as the surface of a measurement target, and thus can clearly visualize the structure of a region around the specific reflecting surface.

Other problems, configurations, and advantageous effects will become apparent from the following description of embodiments.

BRIEF DESCRIPTION OF THE DRAWINGS

FIG. 4 is a diagram showing exemplary operation procedures of the optical image measuring apparatus.

DETAILED DESCRIPTION OF THE EMBODIMENT(S)

Figure 1:
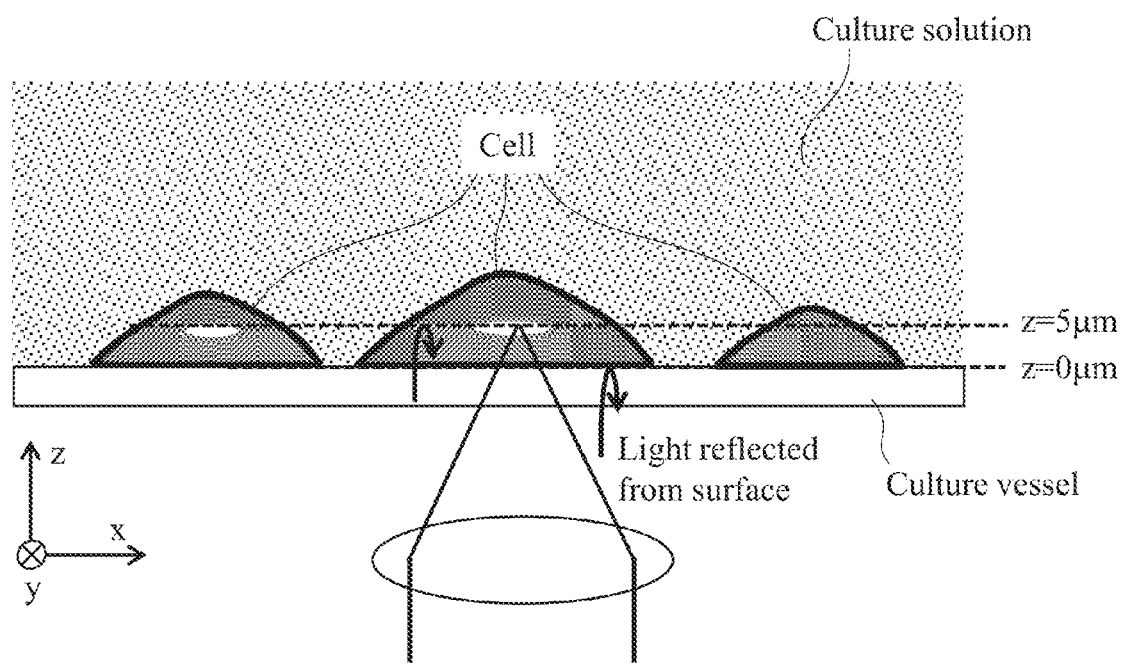
FIG. 1 is a schematic diagram showing an example of a measurement target of an OCT apparatus.
Figure 2A:
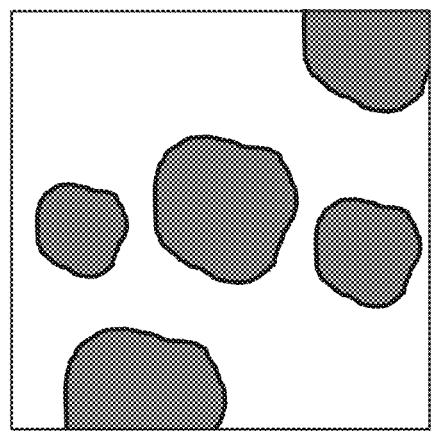
FIGS. 2A and 2B are schematic diagrams showing exemplary images obtained with the conventional OCT apparatus.
Figure 2B:
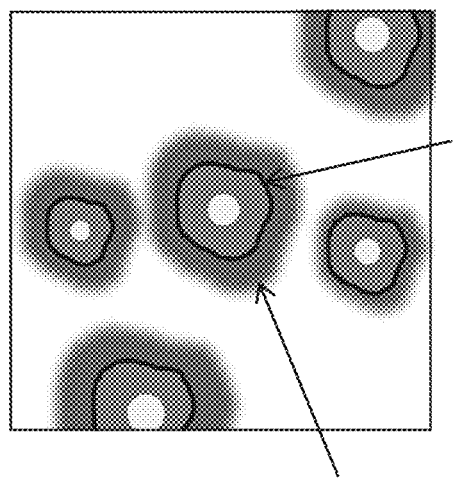

Hereinafter, embodiments of the present invention will be exemplarily described.

(1) As an example, a laser beam emitted from a light source is split into a signal beam and a reference beam, and the signal beam is focused onto a measurement target by an objective lens to irradiate the measurement target. The focus position of the signal beam is moved by a focus position moving unit, and defocus of the reference beam is adjusted by a defocus aberration adjustment unit. The signal beam reflected or scattered by the measurement target is combined with the reference beam by interference optics, whereby three or more interference beams with different phases are generated and detected. An image generation unit generates image data on the basis of such detection signals, and an image processing unit performs image processing on the generated image. Specifically, the image processing unit, on the basis of a first image obtained by not providing a defocus aberration to the reference beam with the defocus aberration adjustment unit and a second image obtained by providing a defocus aberration to the reference beam, generates a third image from which crosstalk components from a specific reflecting surface with high reflectivity, such as the surface of the measurement target, are removed. Herein, the amount of defocus aberration provided to the reference beam by the defocus aberration adjustment unit is the same as that of reflected light components from the specific reflecting surface with high reflectivity contained in the signal beam. The reflecting surface that generates high reflection is a reflecting surface with higher reflectivity than other portions of the measured region, and it is thus considered that reflected light from the reflecting surface obstructs clear visualization of the structure of the peripheral portion. Thus, the reflecting surface is a surface for which a user can select removing the influence of reflected light therefrom. Specifically, when the surface of the measurement target is irradiated with a signal beam through some container, the surface of the container is considered as the reflecting surface, or when the measurement target is contained in a liquid, such as a formalin solution, the liquid surface is considered as the reflecting surface.

Accordingly, it is possible to suppress the influence of strong reflected light from a specific reflecting surface, such as the surface of the measurement target, and thus clearly visualize the structure of a region around the specific reflecting surface.

(2) As an example, the numerical aperture of the objective lens that focuses a signal beam onto the measurement target is set greater than or equal to 0.4.

Accordingly, it is possible to achieve a spatial resolution in the optical axis direction that is greater than or equal to that of the conventional OCT apparatus without using a broadband light source or a wavelength-scanning light source.

(3) As an example, four interference beams are generated by the interference optics. An interference phase of the signal beam and the reference beam of each of the four interference beams differs from one another by an integral multiple of approximately 90°, and a pair of interference beams, which have a difference of approximately 180° in the interference phase of the signal beam and the reference beam, is detected by a current differential photodetector.

As a current differential detector is used, the detector will not be easily saturated even if the intensity of the reference beam is increased. Thus, the signal S/N ratio can be increased than when the current differential detector is not used.

(4) As an example, an objective lens, which is the same objective lens as the objective lens used for focusing the signal beam, a reflecting mirror, and an actuator, which changes the relative distance between the objective lens and the reflecting mirror, are used as the defocus aberration adjustment unit.

Accordingly, it is possible to easily provide the reference beam with the same amount of defocus aberration as that of reflected light components from a specific reflecting surface with high reflectivity contained in the signal beam.

(5) As an example, a laser beam emitted from a light source is split into a signal beam, a first reference beam, and a second reference beam, and the signal beam is focused onto a measurement target by an objective lens to irradiate the measurement target. The focus position of the signal beam is moved by a focus position moving unit, and defocus of the second reference beam is adjusted by a defocus aberration adjustment unit. The signal beam reflected or scattered by the measurement target is split into a first signal beam and a second signal beam. The first signal beam and the first reference beam are combined by first interference optics, whereby three or more interference beams with different phases are generated and detected. The second signal beam and the second reference beam are combined by second interference optics, whereby three or more interference beams with different phases are generated and detected. An image generation unit generates image data on the basis of such detection signals, and an image processing unit performs image processing on the generated image. Specifically, the image processing unit, on the basis of a first image obtained on the basis of the signals from the first interference optics and a second image obtained on the basis of the signals from the second interference optics, generates a third image in which crosstalk components from a specific reflecting surface with high reflectivity, such as the surface of the measurement target, are removed. Herein, the amount of defocus aberration provided to the second reference beam by the defocus aberration adjustment unit is the same as that of reflected light components from the specific reflecting surface with high reflectivity contained in the signal beam.

Accordingly, as the image (i.e., first image) and the image (i.e., second image) can be acquired under that conditions in which a defocus aberration is provided to the reference beam and a defocus aberration is not provided to the reference beam, respectively, through a single measurement, it is possible to suppress the influence of strong reflected light from a specific reflecting surface, such as the surface of the measurement target, in a shorter measurement time, and thus clearly visualize the structure of a region around the specific reflecting surface.

Hereinafter, embodiments of the present invention will be described with reference to the drawings.

Embodiment 1

Figure 3A:
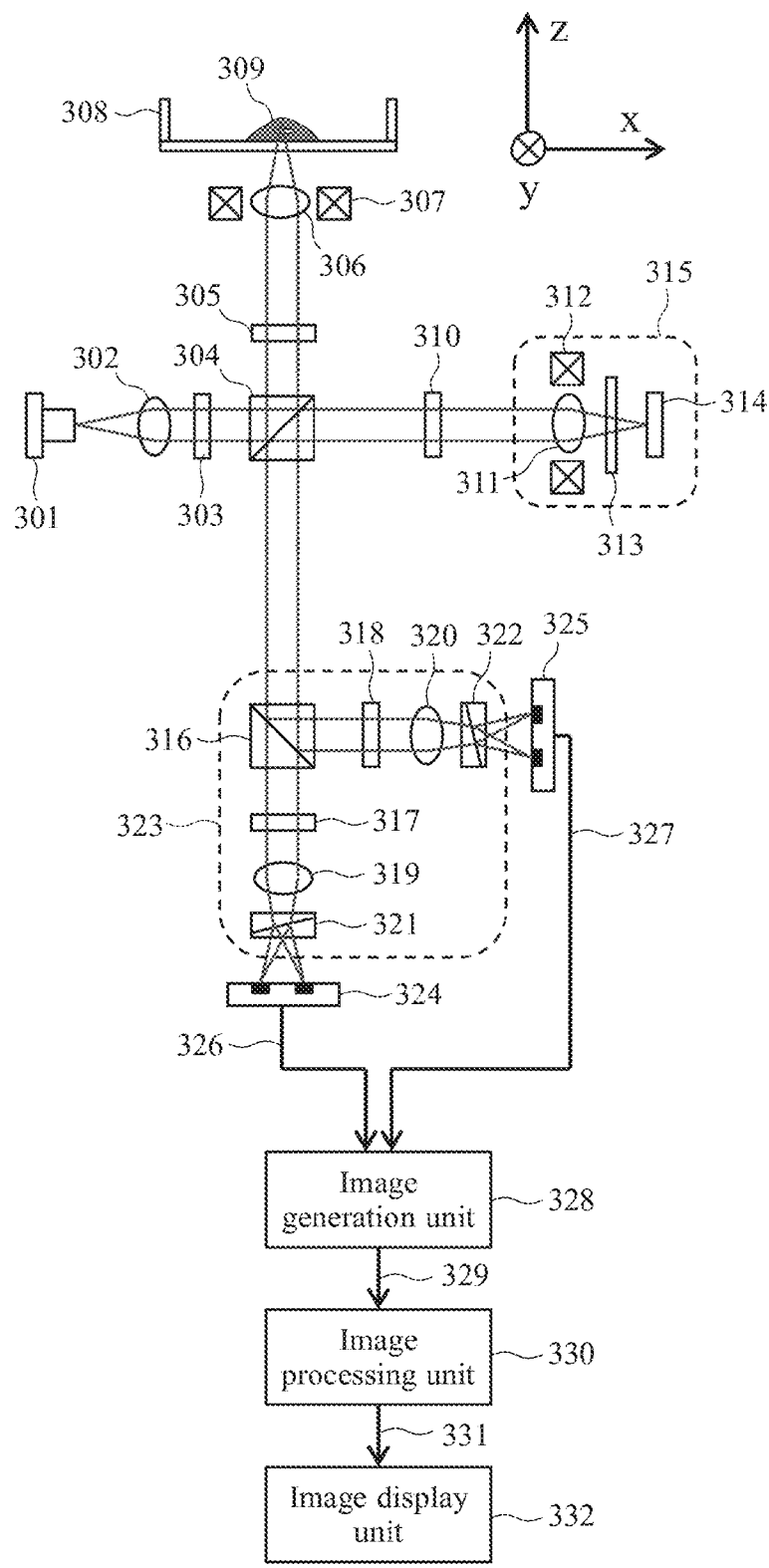
FIGS. 3A and 3B are schematic diagrams showing an exemplary configuration of the optical image measuring apparatus of the present invention.

FIG. 3A is a schematic diagram showing an exemplary configuration of the optical image measuring apparatus of the present invention.

A single laser beam emitted from a light source 301 is converted into a collimated beam by a collimator lens 302, and is subjected to polarization rotation by a λ/2 plate 303 capable of adjusting the optical axis direction, and is further split into two: a signal beam and a reference beam by a light beam splitter including a polarization beam splitter 304. The signal beam passes through a λ/4 plate 305 at which the optical axis is set to about 22.5° with respect to the horizontal direction, and thus is converted from the s-polarized beam into a circularly polarized beam. Then, the beam is focused onto a cultured cell 309 in a culture vessel 308 by an objective lens 306 with a numerical aperture of greater than or equal to 0.4, so as to irradiate the cultured cell 309. Herein, the objective lens 306 is designed to so that a spherical aberration becomes almost zero after a beam has passed through the bottom surface of the culture vessel 308. The objective lens 306 is moved by an objective lens actuator 307, whereby the focus position (i.e., measurement position) of the signal beam is moved by the objective lens 306. The signal beam reflected or scattered by the measurement target passes through the objective lens 306 again, and is then converted from the circularly polarized beam into a p-polarized beam by the λ/4 plate 305. Then, the beam becomes incident on the polarization beam splitter 304. Meanwhile, the reference beam is converted from the p-polarized beam into a circularly polarized beam by a λ/4 plate 310, and then becomes incident on a defocus aberration adjustment unit 315 arranged on the optical path of the reference beam.

The defocus aberration adjustment unit 315 includes an objective lens 311, which is the same objective lens as the objective lens 306, an objective lens actuator 312, a flat plate 313, which is formed of the same material as the culture vessel 308 and has the same thickness as the signal beam transmitting portion, that is, the bottom surface of the culture vessel 308, and a reflecting mirror 314. A defocus aberration of the reference beam can be adjusted by changing the relative position between the objective lens 311 and the reflecting mirror with the objective lens actuator 312. Herein, the flat plate 313 is inserted to set the amount of spherical aberration of the reference beam to be equal to that of the signal beam. Thus, when the culture vessel 308 is changed to another culture vessel with a different material or bottom surface thickness, the flat plate 313 is also changed correspondingly. In order to easily change the flat plate 313, it is desirable to mount a plurality of types of flat plates 313 in advance and provide a mechanism capable of switching the flat plate 313 corresponding to the culture vessel 308 selected by a user. Alternatively, it is also possible to insert a liquid crystal element instead of the flat plate 313 and set the amount of spherical aberration of the reference beam to be equal to that of the signal beam by adjusting the voltage applied to the liquid crystal element. The reference beam that becomes incident on the defocus aberration adjustment unit 315 is focused by the objective lens 311 and is reflected by the reflecting mirror 314 after having passed through the flat plate 313. Then, the beam passes through the flat plate 313 and the objective lens 311 again and is then converted from the circularly polarized beam into a s-polarized beam by the λ/4 plate 310. Then, the beam becomes incident on the polarization beam splitter 304.

The signal beam and the reference beam are combined by the polarization beam splitter 304, whereby a combined beam is generated. The combined beam is guided to interference optics 323 that include a half beam splitter 316, a λ/2 plate 317, a λ/4 plate 318, condenser lenses 319 and 320, and Wollaston prisms 321 and 322. The combined beam that becomes incident on the interference optics 323 is divided into two: a transmitted beam and a reflected beam by the half beam splitter 316. The transmitted beam passes through the λ/2 plate 317 at which the optical axis is set to about 22.5° with respect to the horizontal direction, and is focused by the condenser lens 319, and is further split into two by the Wollaston prism 321, whereby a first interference beam and a second interference beam having a phase difference of 180° are generated. The first interference beam and the second interference beam are detected by a current differential photodetector 324, whereby a differential output signal 336 that is proportional to the intensity difference between the first interference beam and the second interference beam is output.

Meanwhile, the reflected beam passes through the λ/4 plate 318 at which the optical axis is set to about 45° with respect to the horizontal direction, and is focused by the condenser lens 320, and is further split into two by the Wollaston prism 322, whereby a third interference beam and a fourth interference beam having a phase difference of about 180° are generated. Herein, the third interference beam has a phase difference of about 90° from the first interference beam. The third interference beam and the fourth interference beam are detected by a current differential photodetector 325, whereby a differential output signal 327 that is proportional to the intensity difference between the third interference beam and the fourth interference beam is output. The thus generated differential output signals 326 and 327 are input to an image generation unit 328, whereby image data 329 is generated. An image processing unit 330 generates new image data 331 on the basis of the image data 329, and displays the data on the image display unit 332.

FIG. 4 is a diagram showing exemplary operation procedures of the OCT apparatus in this embodiment. First, an xz image of a measurement target, that is, a tomographic image including an optical axis is acquired (S11), and on the basis of the results, a user selects a reflecting surface position ($z_0$) at which strong reflected light, the influence of which should be removed, is generated (S12). The reflecting surface position ($z_0$) in this embodiment is the position of the interface between the culture vessel 308 and the cultured cell 309. It is also possible to simply acquire a one-dimensional image in the optical axis direction (i.e., z-axis direction) instead of the two-dimensional xz image and select a reflecting surface position ($z_0$) at which strong reflected light is generated from the one-dimensional image.

Next, the position z ($z=z_m$) at which xy measurement is to be performed is selected by the user (S13), and an xy image, which is obtained by repeatedly acquiring xy images at the position z and averaging the xy images, is generated as a first image (S14). In order to acquire an xy image, the objective lens actuator 307 is driven so that the position of the signal beam focused by the objective lens 306 is two-dimensionally moved on a plane perpendicular to the optical axis. The reference beam is a plane wave. That is, the objective lens actuator 312 of the defocus aberration adjustment unit 315 is driven to adjust the relative distance between the objective lens 311 and the reflecting mirror 314 so that the surface of the reflecting mirror 314 becomes the position at which the reference beam is focused by the objective lens 311. At this time, the structure at the defocused position z=$z_0$ appears in the first image as an afterimage (i.e., crosstalk) due to the influence of strong reflected light from z=$z_0$.

Figure 3B:
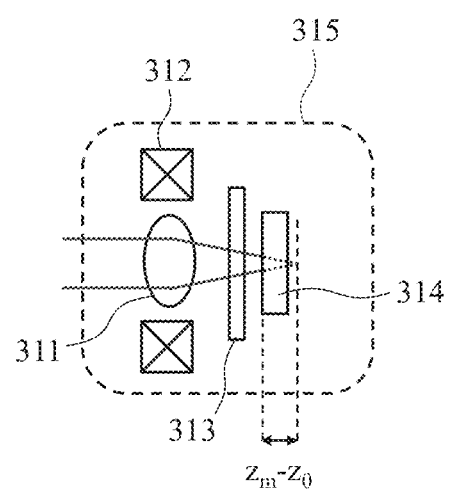

After that, the defocus aberration adjustment unit 315 is adjusted to provide the reference beam with the same amount of defocus aberration as that of reflected light from z=$z_0$, and an xy image, which is obtained by repeatedly acquiring xy images under such condition and averaging the xy images, is generated as a second image (S15). At this time, as shown in FIG. 3B, the defocus aberration is provided by displacing the focus position of the reference beam from the reflecting mirror 314 by $z_0$-$z_m$ with the objective lens actuator 312. Herein, the second image is an xy image at z=$z_0$ of the defocused measurement target. When the luminance of the xy image is adjusted, the xy image becomes almost the same as the image that remains as the afterimage in the first image. The image processing unit 330 subtracts the second image with the adjusted luminance from the first image, thereby generating a third image with the removed afterimage (S16), and displays the third image on the image display unit 332 (S17).

As described above, a tomographic image at z=$z_m$ of the measurement target from which crosstalk components due to reflected light from z=$z_0$ are removed is displayed. In other words, the amount of defocus aberration that is provided to the reference beam by the defocus aberration adjustment unit 315 during acquisition of the second image in Step 15 can be considered as allowing the crosstalk components, which have appeared in the first image acquired in Step 14, to be removed or reduced in the third image.

Hereinafter, the operation principle and the advantageous effects of this embodiment will be described using equations. The Jones vector of the combined beam at a time point when the combined beam becomes incident on the interference optics 323 is represented by the following equation (1):

$$\begin{pmatrix} E_{sig} \\ E_{ref} \end{pmatrix} \quad (1)$$

Herein, $E_{sig}$ can be represented by the following equation (2) by using the position z in the optical axis direction at which the signal beam is focused, the position $z_j$ in the optical axis direction of the j-th reflecting point counted from z=$z_0$ of the measurement target direction (z=$z_0$ is the $0^{th}$ position), and the electric field amplitude $A_{sig,j}$ and the phase $\theta_{sig,j}$ of the reflected light from the j-th reflecting point.

$$E_{sig} = \sum_j A_{sig,j} \exp[i(W(z-z_j)r^2 + \theta_{sig,j})] \quad (2)$$

Herein, $W(z-z_j)r^2$ represents a defocus aberration, and W is given by $W=2\pi \cdot NA^2 \cdot z/(\lambda \cdot d^2)$. r represents the distance from the center of the optical axis, d represents the radius of the lens aperture, and $\lambda$ represents the wavelength of the laser beam.

In equation (2), the square of the amplitude $A_{sig,0}$ of the reflected light from z=$z_0$ is greater than the square of the amplitude of the reflected light from other reflecting points by one digit or more. Meanwhile, $E_{ref}$ is represented as follows.

$$E_{ref} = A_{ref} \exp[i(W\Delta z_{ref} r^2 + \theta_{ref})] \quad (3)$$

Herein, $A_{ref}$ and $\theta_{ref}$ represent the electric field amplitude and the phase of the reference beam, respectively, and $\Delta z_{ref}$ represents the defocus amount of the reference beam (i.e., distance in the optical axis direction between the position of the reference beam focused by the objective lens 311 and the reflecting mirror 314). $W\Delta z_{ref} r^2$ represents a defocus aberration provided to the reference beam by the defocus aberration adjustment unit 315.

The Jones vector of the combined beam that has passed through the half beam splitter 316 and has further passed through the $\lambda/2$ plate 317 is represented as follows.

$$\begin{pmatrix} 1/\sqrt{2} & -1/\sqrt{2} \\ 1/\sqrt{2} & 1/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} E_{sig} - E_{ref} \\ E_{sig} + E_{ref} \end{pmatrix} \quad (4)$$

The combined beam represent by equation (4) is split into p-polarized light components and s-polarized light components by the Wollaston prism 321, which are then differentially detected by the current differential photodetector 324, whereby a differential output signal 326 represented by the following equation is generated.

$$I = \int_D \left[\frac{1}{4}|E_{sig}+E_{ref}|^2 - \frac{1}{4}|E_{sig}-E_{ref}|^2\right]d\rho \quad (5)$$

Herein, $\rho$ represents the coordinate vector of the beam cross-section, D represents the detected region, and $\int D d\rho$ means an integration operation in the entire range in the beam. The conversion efficiency of the detector is set to 1 for the sake of simplicity.

Meanwhile, the Jones vector of the combined beam that has been reflected by the half beam splitter 316 and has further passed through the $\lambda/4$ plate 318 is represented as follows.

$$\begin{pmatrix} i/\sqrt{2} & 1/\sqrt{2} \\ 1/\sqrt{2} & i/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} i(E_{sig} - iE_{ref}) \\ E_{sig} + E_{ref} \end{pmatrix} \quad (5)$$

The combined beam represented by equation (6) is split into p-polarized light components and s-polarized light components by the Wollaston prism 322, which are then differentially detected by the current differential photodetector 325, whereby a differential output signal 327 represented by the following equation is generated.

$$Q = \int_D \left[\frac{1}{4}|E_{sig}+iE_{ref}|^2 - \frac{1}{4}|E_{sig}-iE_{ref}|^2\right]d\rho \quad (7)$$

Further, when integration is executed by substituting equations (2) and (3) into equations (5) and (7), the following equations are obtained.

$$I(x,y) = \sum_j A_{ref} A_{sig,j}(x,y) \quad (8)$$

$$\frac{\sin(k_{eff}(z-z_j-\Delta z_{ref}))}{k_{eff}(z-z_j-\Delta z_{ref})}\cos(k_{eff}(z-z_j-\Delta z_{ref})+\theta_j(x,y))$$

-continued $$Q(x, y) = \sum_j A_{ref} A_{sig,j}(x, y) \qquad (9)$$

$$\frac{\sin(k_{eff}(z - z_j - \Delta z_{ref}))}{k_{eff}(z - z_j - \Delta z_{ref})} \sin(k_{eff}(z - z_j - \Delta z_{ref}) + \theta_j(x, y))$$

Herein, $\theta_j = \theta_{sig,j} - \theta_{ref}$ and $k_{eff} = \pi \cdot NA^2/\lambda$. In addition, in order to explicitly show that I, Q and $A_{sig,j}$, $\theta_j$ are the functions of the focus position (x,y) of the signal beam in the xy direction (i.e., plane direction perpendicular to the optical axis), they are rewritten as $=I(x,y)$, $Q=Q(x,y)$, $A_{sig,j}=A_{sig,j}(x,y)$, and $\theta_j=\theta_j(x,y)$.

The image generation unit 328 generates the image data 329 by performing the following operation on such signals.

$$\text{Data}(x,y) = \{I(x,y)\}^2 + \{Q(x,y)\}^2 \qquad (10)$$

Hereinafter, a case where an xy image at the position z of the m-th reflecting point is acquired will be considered, and description will be made of a case where a signal beam is focused at the position $z_m$ ($z=z_m$). When a defocus aberration is not provided to the reference beam, that is, when $\Delta z_{ref}=0$, equations (8) and (9) are approximately represented as follows.

$$I(\Delta z_{ref} = 0; x, y) = A_{ref} A_{sig,m}(x, y) \cos \theta_m(x, y) + \qquad (11)$$

$$A_{ref} A_{sig,0}(x, y) \frac{\sin(k_{eff}(z_m - z_0))}{k_{eff}(z_m - z_0)} \cos(k_{eff}(z_m - z_0) + \theta_0(x, y))$$

$$Q(\Delta z_{ref} = 0; x, y) = A_{ref} A_{sig,m}(x, y) \sin \theta_m(x, y) + \qquad (12)$$

$$A_{ref} A_{sig,0}(x, y) \frac{\sin(k_{eff}(z_m - z_0))}{k_{eff}(z_m - z_0)} \sin(k_{eff}(z_m - z_0) + \theta_0(x, y))$$

Herein, the equations were simplified regarding that the contribution of reflected light components other than the reflected light from $z=z_0$ is sufficiently small, that is, regarding that the following equation is satisfied for $j>0$.

$$|A_m| \gg |A_j| \frac{\sin(k_{eff}(z_m - z_j))}{k_{eff}(z_m - z_j)} \qquad (13)$$

The image data at this time is represented as follows.

$$\text{Data1}(\Delta z_{ref} = 0; x, y) = \{I(\Delta z_{ref} = 0; x, y)\}^2 + \qquad (14)$$

$$\{Q(\Delta z_{ref} = 0; x, y)\}^2$$

$$= A_{ref}^2 A_{sig,m}^2(x, y) + A_{ref}^2 A_{sig,0}^2(x, y)$$

$$\left[\frac{\sin(k_{eff}(z_m - z_0))}{k_{eff}(z_m - z_0)}\right]^2 +$$

$$2 A_{ref}^2 A_{sig,0}(x, y) A_{sig,m}(x, y) \frac{\sin(k_{eff}(z_m - z_0))}{k_{eff}(z_m - z_0)}$$

$$\cos(k_{eff}(z_m - z_0) + \theta_m - \theta_0)$$

The first term of equation (14) represents image data of an ideal xy image not containing crosstalk of reflected light from $z=z_0$, and the second term and the third term correspond to image data of an afterimage that occurs due to crosstalk of reflected light from $z=z_0$. The third term depends on the phases of the signal beam and the reference beam ($\theta_m - \theta_0$). Thus, the third term is considered to take a random value in each measurement due to random phase fluctuations resulting from disturbance. Thus, the contribution of the third term can be significantly reduced by applying an averaging process a sufficient number of times. When phase fluctuations resulting from disturbance are small, the same advantageous effects are obtained by modulating the phase of the reference beam using a piezoelectric element and the like. Thus, the first image data that is obtained by repeatedly performing measurement and an averaging process can be approximately represented as follows.

$$\text{AveragedData1}(\Delta z_{ref} = 0; x, y) = \qquad (15)$$

$$A_{ref}^2 A_{sig,m}^2(x, y) + A_{ref}^2 A_{sig,0}^2(x, y) \left[\frac{\sin(k_{eff}(z_m - z_0))}{k_{eff}(z_m - z_0)}\right]^2$$

Meanwhile, when a defocus aberration corresponding to $\Delta z_{ref} = z_m - z_0$ is provided to the reference beam, equations (8) and (9) can be approximately represented as follows.

$$I(x,y) = A_{ref} A_{sig,0}(x,y) \cos \theta_0(x,y) \qquad (16)$$

$$Q(x,y) = A_{ref} A_{sig,0}(x,y) \sin \theta_0(x,y) \qquad (17)$$

The image data at this time is represented by:

$$\text{Data}(\Delta z_{ref} = z_m - z_0; x, y) = \qquad (18)$$

$$\{I(\Delta z_{ref} = z_m - z_0; x, y)\}^2 + \{Q(\Delta z_{ref} = z_m - z_0; x, y)\}^2 =$$

$$A_{ref}^2 A_{sig,0}^2(x, y)$$

Equation (18) represents image data of an xy image at $z=z_0$ acquired by moving the signal beam defocused by $z_m - z_0$. In order to make the influence of detector noise and the like be equal to that of the first image, the image represented by equation (18) is also subjected to repeated measurement and averaging process, whereby second image data AveragedData2($\Delta z_{ref} = z_m - z_0$; x,y) is acquired. The first image and the second image are subjected to the following image processing by the image processing unit 330, whereby third image data is generated.

$$\text{NewData}(x, y) = \text{AveragedData}(\Delta z_{ref} = 0; x, y) - \qquad (19)$$

$$g \cdot \text{AveragedData}(\Delta z_{ref} = z_m - z_0; x, y)$$

$$= A_{ref}^2 A_{sig,m}^2(x, y)$$

Herein, g represents a known amount given by the following equation.

$$g = \left[\frac{\sin(k_{eff}(z_m - z_0))}{k_{eff}(z_m - z_0)}\right]^2 \qquad (20)$$

The third image represented by equation (19) is an image from which crosstalk of reflected light from $z=z_0$ is removed, that is, an image from which an afterimage of the structure of $z=z_0$ is removed.

That is, in this embodiment, it is possible to suppress crosstalk due to reflected light from $z=z_0$ by subtracting an image, which has been acquired by providing a defocus aberration to the reference beam, the luminance of which is adjusted at a predetermined magnification, from an xy image acquired by using a plane wave as the reference beam and not providing a defocus aberration to the reference beam. Accordingly, the structure of a region around $z=z_0$ can be visualized more clearly than with the conventional OCT apparatus.

Hereinafter, the spatial resolution of the optical image measuring apparatus of the present invention will be described. The spatial resolution in the optical axis direction is defined as the full width at half maximum of a peak, which corresponds to a single reflecting surface, obtained when the objective lens is moved in the z direction. A signal that corresponds to equation (10) when there is only one reflecting surface is represented by the following equation.

$$\text{Data}(x, y) = A_{ref}^2 A_{sig,0}^2(x, y)\text{sinc}^2\left(\pi \cdot \frac{(z-z_0)}{\lambda} NA^2\right) \quad (21)$$

From the above equation, the full width at half maximum of a signal from a single reflecting surface, that is, spatial resolution in the optical axis direction can be approximately represented as follows.

$$0.886 \frac{\lambda}{NA^2} \quad (22)$$

Herein, $\lambda$ represents the wavelength of a laser beam and NA represents the numerical aperture of the objective lens 306.

The wavelength of a light beam used by an OCT apparatus is typically about 600 to 1300 nm that are difficult to be absorbed by hemoglobin or even by water. For example, provided that the numerical aperture of the objective lens is 0.4, spatial resolution in the optical axis direction at a wavelength of 600 to 1300 nm is about 3.3 to 7.2 μm, and the plane resolution (about $\lambda$/NA) is about 1.5 to 3.6 μm. Thus, it is possible to achieve resolution in the optical axis direction that is greater than or equal to that of the conventional OCT apparatus.

In this embodiment, a pair of interference beams, which have a difference of approximately 180° in the interference phase of a signal beam and a reference beam, is detected by a current differential photodetector. Thus, the detector will not be easily saturated even if the intensity of the reference beam is increased, and the signal S/N ratio can thus be increased than when the current differential detector is not used.

Further, in this embodiment, as the objective lens 311 that is the same objective lens as the objective lens 306 is used in the defocus aberration adjustment unit 315, it is possible to easily provide the reference beam with the same amount of defocus aberration as that of reflected light from a specific reflecting surface with high reflectivity.

Although four interference beams each having a phase difference of 90° are generated by the interference optics 323 and detected in this embodiment, the same advantageous effects as those in this embodiment can be obtained as long as the number of the interference beams is greater than or equal to three. For example, it is also possible to generate three interference beams each having a phase difference of 60°.

In addition, although an averaging process is applied to each of the first image and the second image to suppress the influence of reflected light from $z=z_0$ more in this embodiment, the averaging process is not an essential condition for obtaining the advantageous effects of the present invention. That is, the effect of suppressing crosstalk that is obtained by the averaging process and the effect of suppressing crosstalk in accordance with the present invention are independent.

Embodiment 2

Figure 5:
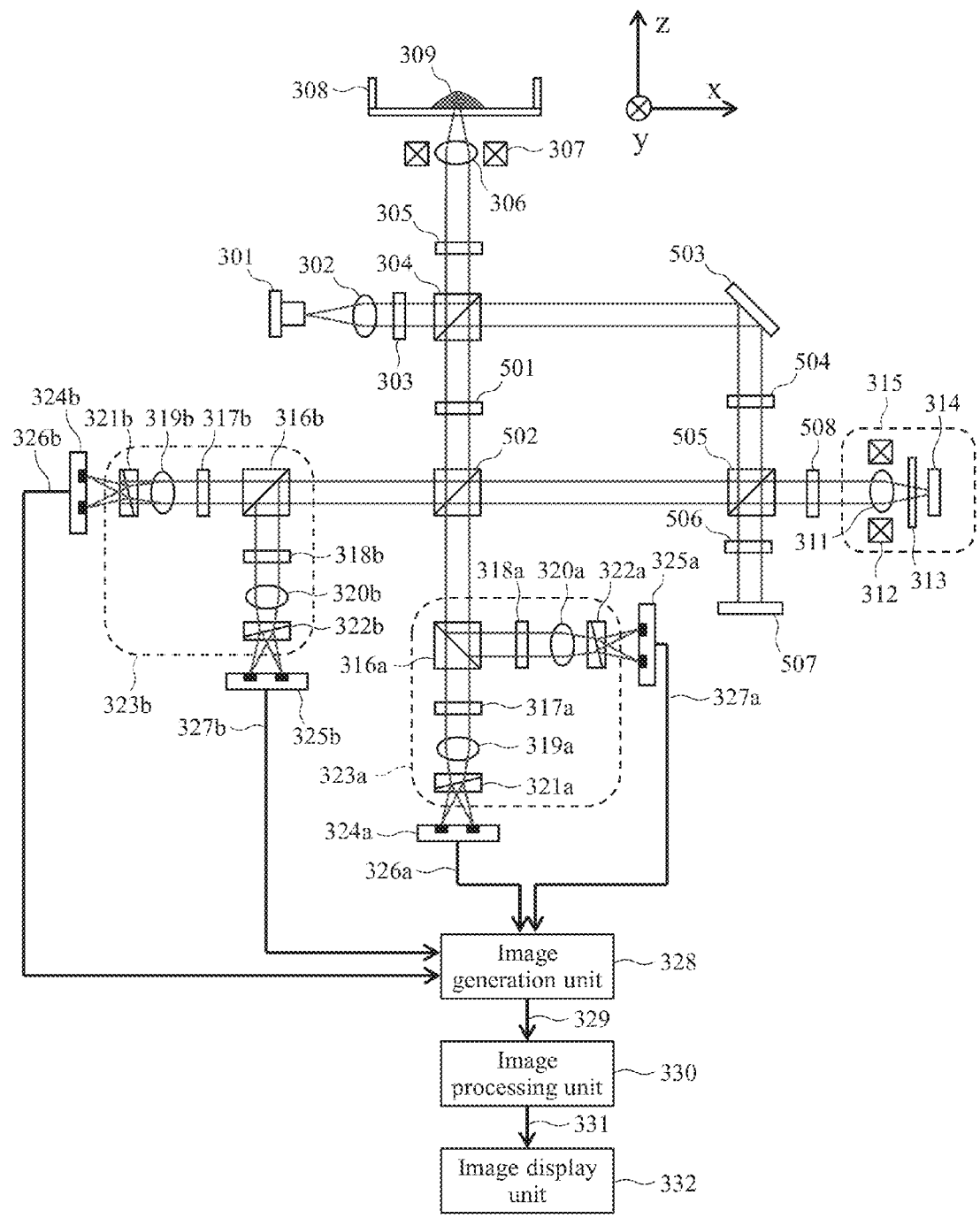
FIG. 5 is a schematic diagram showing an exemplary configuration of the optical image measuring apparatus of the present invention.

FIG. 5 is a schematic diagram showing another embodiment of an optical image measuring apparatus in accordance with the present invention. It should be noted that components that are the same as those shown in FIG. 3 are denoted by the same reference numerals. Thus, some of the descriptions thereof are omitted. This embodiment differs from Embodiment 1 in that an image acquired by using a plane wave as the reference beam and not providing a defocus aberration to the reference beam and an image acquired by providing a defocus aberration to the reference beam are obtained through a single measurement.

A laser beam emitted from the light source 301 is split into a signal beam and a reference beam by a polarization beam splitter. The signal beam passes through the same optical path as that in Embodiment 1, and becomes incident on the polarization beam splitter 304 again. The signal beam passes through the polarization beam splitter 304, and is subjected to polarization rotation by about 45° by a $\lambda$/2 plate 501 at which the optical axis is set to about 22.5° with respect to the horizontal direction, and is then split into p-polarized light components and s-polarized light components by a polarization beam splitter 502, whereby a first signal beam and a second signal beam are generated. The reference beam is reflected by a reflecting mirror 503, and is subjected to polarization rotation by about 45° by a $\lambda$/2 plate 504 at which the optical axis is set to about 22.5° with respect to the horizontal direction, and is then split into s-polarized light components and p-polarized light components by a polarization beam splitter 505, whereby a first reference beam and a second reference beam are generated. The first reference beam is reflected by the polarization beam splitter 505, and then becomes incident on the polarization beam splitter 502. The second reference beam passes through the polarization beam splitter 505, and is converted from the p-polarized beam into a circularly polarized beam by the $\lambda$/4 plate 506 at which the optical axis is set to about 22.5° with respect to the horizontal direction. Then, the beam becomes incident on the $\lambda$/4 plate 506 again after being reflected by a reflecting mirror 507, and thus is converted from the circularly polarized beam into a s-polarized beam, and then becomes incident on the polarization beam splitter 505. Further, the second reference beam is reflected by the polarization beam splitter 505, and is converted from the s-polarized beam into a circularly polarized beam by a $\lambda$/4 plate 508 at which the optical axis is set to about 22.5° with respect to the horizontal direction. Then, the beam is provided with a defocus aberration by the defocus aberration adjustment unit 315, and becomes incident on the $\lambda$/4 plate 508 again to be converted from the circularly polarized beam into a p-polarized beam, and further passes through the polarization beam splitter 505 and becomes incident on the polarization beam splitter 502.

The first signal beam and the first reference beam are combined by the polarization beam splitter 502, whereby a first combined beam is generated. The second signal beam and the second reference beam are combined by the polarization beam splitter 502, whereby a second combined beam is generated. The first combined beam is guided to first interference optics 323a that include a half beam splitter 316a, a λ/2 plate 317a, a λ/4 plate 318a, condenser lenses 319a and 320a, and Wollaston prisms 321a and 322a. The second combined beam is guided to second interference optics 323b that include a half beam splitter 316b, a λ/2 plate 317b, a λ/4 plate 318b, condenser lenses 319b and 320b, and Wollaston prisms 321b and 322b. The function of each of the first interference optics 323a and the second interference optics 323b is the same as that of the interference optics 323 in Embodiment 1. Thus, the description thereof is omitted herein.

Differential output signals 326a and 327a that are generated by detecting interference beams generated by the first interference optics 323a are input to the image generation unit 328, whereby image data corresponding to the image represented by equation (14) in Embodiment 1 is generated. Meanwhile, differential output signals 326b and 327b that are generated by detecting interference beams generated by the second interference optics 323b are input to the image generation unit 328, whereby image data corresponding to the image represented by equation (18) in Embodiment 1 is generated.

That is, in this embodiment, it is possible to, through a single measurement, acquire an image obtained by not providing a defocus aberration to the reference beam and an image obtained by providing a defocus aberration to the reference beam. Thus, it is possible to obtain a third image in which crosstalk of reflected light from $z=z_0$ is suppressed in a shorter measurement time than in Embodiment 1.

Embodiment 3

Figure 6:
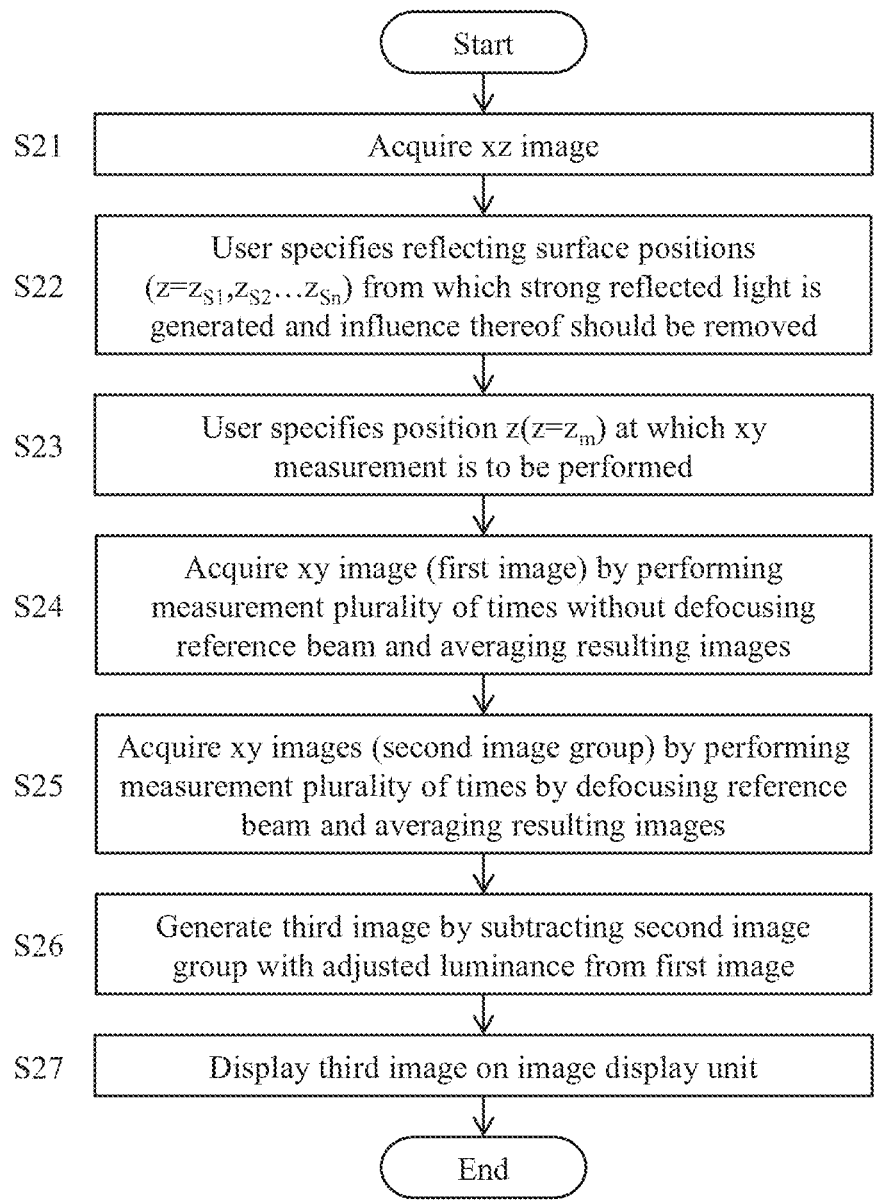
FIG. 6 is a diagram showing exemplary operation procedures of the optical image measuring apparatus of the present invention.

FIG. 6 is a diagram showing exemplary operation procedures of the optical image measuring apparatus of the present invention. As the device configuration is the same as that in Embodiment 1 shown in FIG. 3, the description thereof is omitted. This embodiment differs from Embodiment 1 in that crosstalk due to reflected light from a plurality of positions z is suppressed. Herein, suppose a case where a measurement target has n portions that generate strong reflection, that is, n reflecting surfaces that can be selected by a user to remove the influence of reflected light therefrom, and the n reflecting surfaces are $S_1, \ldots, S_n$-th reflecting surfaces counted from the surface.

First, an xz image is acquired (S21), and a user is asked to specify target reflecting surface positions ($z=z_{S1}, z_{S2}, \ldots, z_{Sn}$) from which crosstalk should be removed (S22). Next, the user is asked to select the position z ($z=z_m$) at which measurement is to be performed (S23), so that an xy image, which is obtained by repeatedly acquiring xy images at the position z and averaging the xy images, is generated as a first image (S24). Then, the reference beam is provided with the same amount of defocus aberration as that of reflected light from the target reflecting surface positions from which crosstalk should be removed (i.e., reflected light from $z=z_{S1}, z_{S2}, \ldots, z_{Sn}$), and xy images, which are obtained by repeatedly acquiring xy images under such condition and averaging the xy images, are generated as a second image group (S25). The image processing unit 330 subtracts the second image group with adjusted luminance from the first image, thereby generating a third image with the removed afterimage (S26), and causes the image display unit 332 to display the image (S27).

Hereinafter, the operation principle and advantageous effects of this embodiment will be described using equations. It is assumed that the square of the amplitude of reflected light from the specific reflecting surface is greater than the square of the amplitude of reflected light from other reflecting surfaces by 1 digit or more. In addition, hereinafter, description will be made of a case where an xy image for the m-th reflecting surface is acquired, and a signal beam is focused onto the position $z_m$ ($z=z_m$). The differential output signals 326 and 327 for when a defocus aberration is not provided to the reference beam, that is, when $\Delta z_{ref}=0$ is approximately represented by the following equation.

$$I(\Delta z_{ref} = 0; x, y) = A_{ref}A_{sig,m}(x, y)\cos\theta_m(x, y) + \sum_{j=S_1}^{S_n} A_{ref}A_{sig,j}(x, y)\frac{\sin(k_{eff}(z_m - z_j))}{k_{eff}(z_m - z_j)}\cos(k_{eff}(z_m - z_j) + \theta_j(x, y)) \quad (23)$$

$$Q(\Delta z_{ref} = 0; x, y) = A_{ref}A_{sig,m}(x, y)\cos\theta_m(x, y) + \sum_{j=S_1}^{S_n} A_{ref}A_{sig,j}(x, y)\frac{\sin(k_{eff}(z_m - z_j))}{k_{eff}(z_m - z_j)}\sin(k_{eff}(z_m - z_j) + \theta_j(x, y)) \quad (24)$$

The first image data, which is obtained by acquiring image data generated on the basis of the detection signals represented by equations (23) and (24) a plurality of times and averaging them, is approximately represented by the following equation.

$$AveragedData(\Delta z_{ref} = 0; x, y) = \quad (25)$$
$$A_{ref}^2 A_{sig,m}^2(x, y) + \sum_{j=S_1}^{S_{n_1}} A_{ref}^2 A_{sig,j}^2(x, y) \left[\frac{\sin(k_{eff}(z_m - z_j))}{k_{eff}(z_m - z_j)}\right]^2$$

Herein, the equation is simplified using the phenomenon that the contribution of the term that depends on the phases of the signal beam and the reference beam becomes smaller by the averaging process. Meanwhile, a detection signal for when a defocus aberration of reflected light from the $S_p$-th reflecting surface is provided to the reference beam, that is, when $\Delta z_{ref}=z_m-z_{Sp}$ is approximately represented as follows:

$$I(\Delta z_{ref}=z_m-z_{Sp};x,y)=A_{ref}A_{sig,S_p}(x,y)\cos\theta_{S_p}(x,y) \quad (26)$$

$$Q(\Delta z_{ref}=z_m-z_{Sp};x,y)=A_{ref}A_{sig,S_p}(x,y)\sin\theta_{S_p}(x,y) \quad (27)$$

Thus, the averaged image data is represented as follows:

$$AveragedData(\Delta z_{ref}=z_m-z_{Sp};x,y)=A_{ref}^2 A_{sig,S_p}^2(x,y) \quad (28)$$

The third image data is computed in accordance with the following equation using the first image data given by equation (25) and the second image data group ($S_p=S_1, S_2, \ldots, S_n$) represented by equation (28).

$$NewData(x, y) = AveragedData(\Delta z_{ref} = 0; x, y) - \quad (29)$$
$$\sum_{j=S_1}^{S_n} g_j \cdot AveragedData(\Delta z_{ref} = z_m - z_j; x, y)$$
$$= A_{ref}^2 A_{sig,m}^2(x, y)$$

$$g_j = \left[\frac{\sin(k_{eff}(z_m - z_j))}{k_{eff}(z_m - z_j)}\right]^2 \quad (30)$$

The third image data represented by equation (29) is an image in which crosstalk components from a plurality of reflecting surfaces is suppressed.

That is, in this embodiment, it is possible to, by subtracting a plurality of images (i.e., second image group) acquired by providing a predetermined amount of defocus aberration to the reference beam, the luminance of which is adjusted at a predetermined magnification, from an image (i.e., first image) acquired by not providing a defocus aberration to the reference beam, obtain an image from which crosstalk due to not only reflected light from a single specific reflecting surface but also reflected light from a plurality of reflecting surfaces, which are selected by a user, is removed. Accordingly, it is possible to more clearly visualize a region around the specific reflecting surface from which strong reflection is generated.

Embodiment 4

Figure 7:
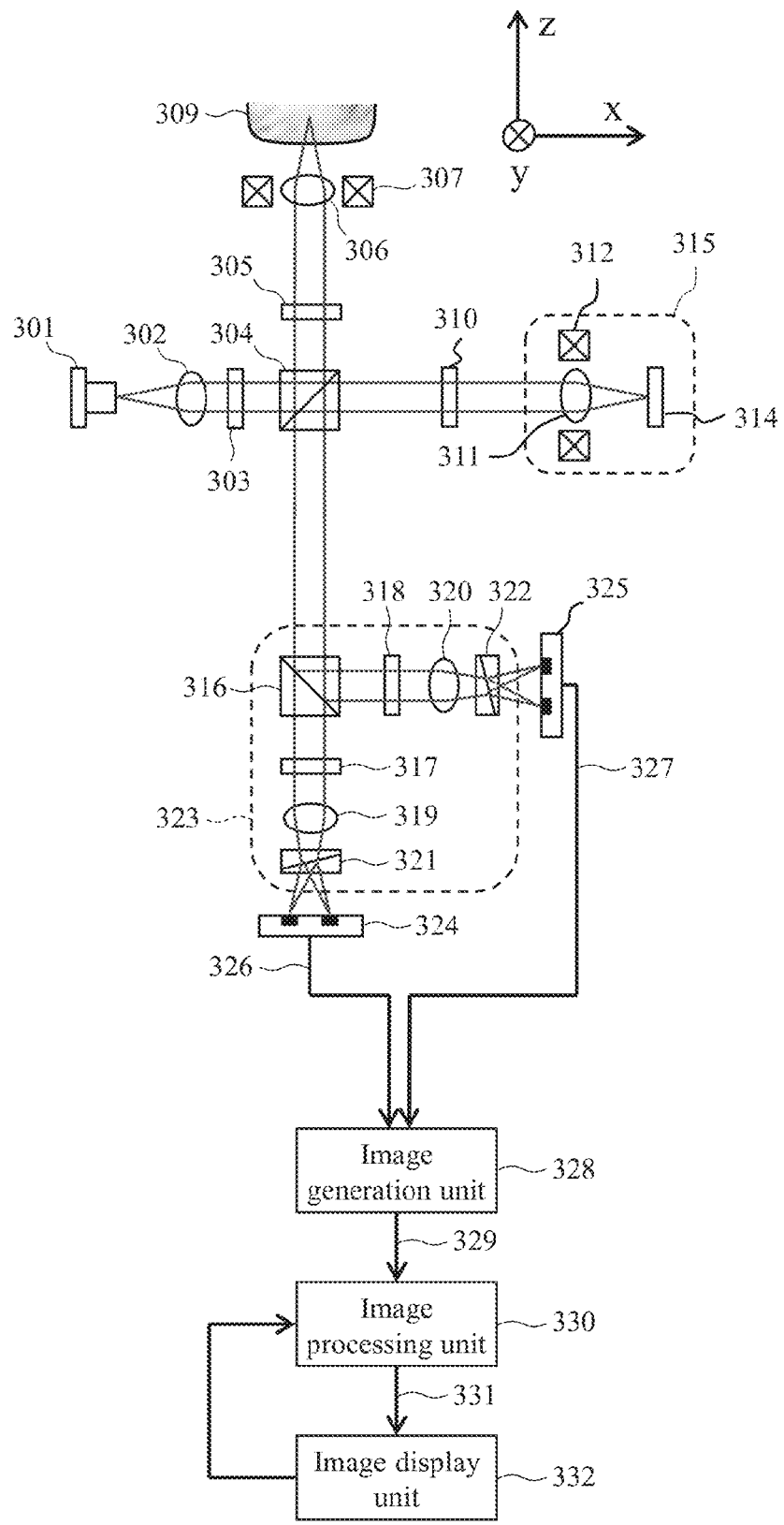
FIG. 7 is a schematic diagram showing another embodiment of an optical image measuring apparatus in accordance with the present invention.

FIG. 7 is a schematic diagram showing another embodiment of an optical image measuring apparatus in accordance with the present invention. It should be noted that components that are the same as those shown in FIG. 3 are denoted by the same reference numerals. Thus, some of the descriptions thereof are omitted. In this embodiment, a case is supposed where a measurement target holding portion like a culture vessel for holding a measurement target is not necessary, or a case a measurement target holding portion is difficult to be provided. Thus, a signal beam in this embodiment does not irradiate the measurement target through a culture vessel unlike in Embodiment 1 but directly irradiates the measurement target 309. To cope with this, in this embodiment, the flat plate 313 is removed from the defocus aberration adjustment unit 315. This embodiment differs from Embodiment 1 in this point. Further, in this embodiment, the image processing method performed by the image processing unit 330 differs from that in Embodiment 1.

The operation methods other than the image processing method are the same as those in Embodiment 1. Thus, herein, only the image processing method performed by the image processing unit 330 will be described. The operations of up to acquiring the first image data AveragedData1 ($\Delta z_{ref}=0;x,y$) represented by equation (15) and the operation of up to acquiring the second image data AveragedData2 ($\Delta z_{ref}=z_m-z_0;x,y$) represented by equation (18) are the same as those in Embodiment 1. The image processing unit 330 generates the third image data by performing the following operation on the first and second image data.

$$NewData(x, y) = AveragedData(\Delta z_{ref} = 0; x, y) - \\ G \cdot AveragedData(\Delta z_{ref} = z_m - z_0; x, y) \\ = A_{ref}^2 A_{sig,m}^2(x, y)$$ (31)

Herein, G represents a given constant that can be freely set by a user, and the initial value thereof is set to g given by equation (20).

Figure 8A:
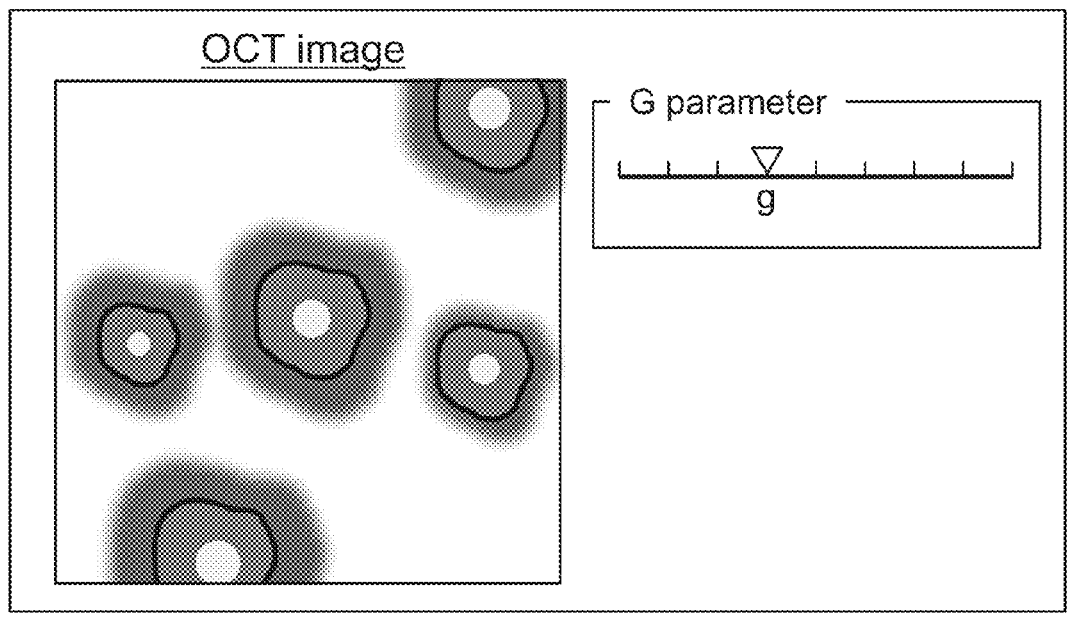
FIGS. 8A and 8B are schematic diagrams of an image display unit.
Figure 8B:
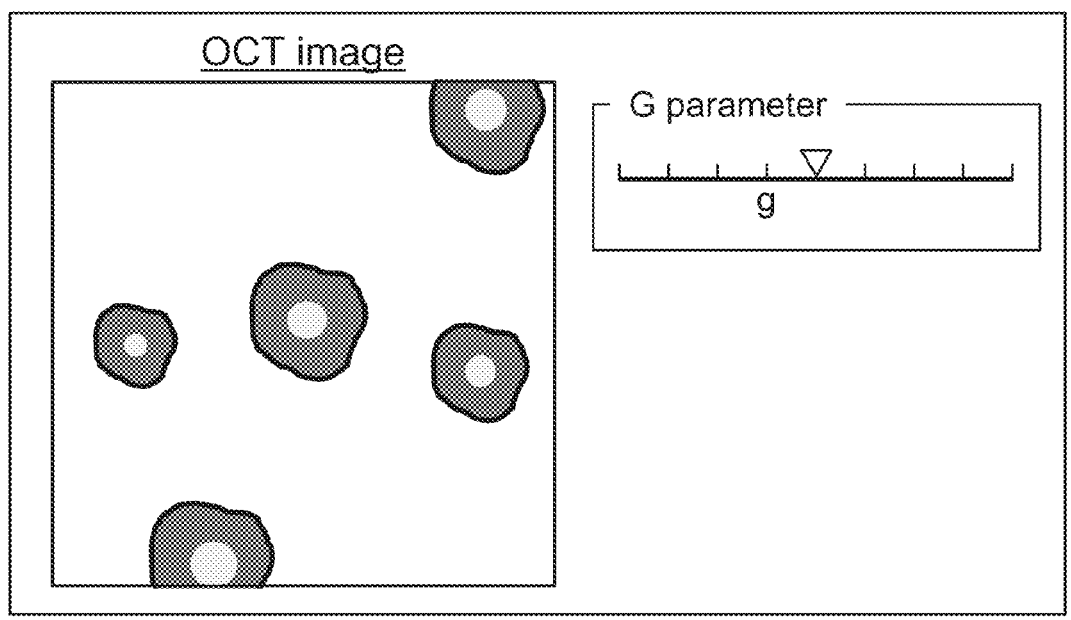

The third image that is based on the third image data is displayed on the image display unit 332. FIG. 8A is a schematic diagram of the image display unit 332 at this time. The image display unit 332 displays the third image and the value of G at that time. The user is able to freely set the value of G on the screen using a keyboard, a mouse, or the like. The output third image depends on the value of G, and ideally, G=g is the optimal value. However, there are cases where G=g is not the optimal value due to discrepancy from an ideal state resulting from adjustment errors of the optics and the like. In this embodiment, when the user observes the output third image and determines that G=g is not the optimal value for removing crosstalk of reflected light from $z=z_0$, the value of G is changed to a given value that is determined to be optimal by the user. The changed value of G is transmitted to the image processing unit 330, so that the third image data is generated again and is displayed on the image display unit 332. FIG. 8B shows a schematic diagram of the image display unit 332 at this time. As described above, in this embodiment, the user is able to freely set the value of G in equation (31). Thus, even when G=g is not the optimal value due to adjustment errors of the optics and the like, it is possible to increase the possibility of being able to obtain an image from which crosstalk of reflected light from $z=z_0$ is removed with higher accuracy.

It should be noted that the present invention is not limited to the aforementioned embodiments, and includes a variety of variations. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add/remove/substitute a configuration of another embodiment.

DESCRIPTION OF SYMBOLS

301: Light source
302: Collimator lens
303, 317: λ/2 plate
304: Polarization beam splitter
305, 310, 318: λ/4 plate
306: Objective lens
307: Objective lens actuator
308: Culture vessel
309: Cultured cell
315: Defocus aberration adjustment unit
323: Interference optics
316: Half beam splitter
319, 320: Condenser lens
321, 322: Wollaston prism
324, 325: Current differential photodetector
328: Image generation unit
330: Image processing unit
332: Image display unit

What is claimed is:
1. An optical image measuring apparatus comprising:
a light source configured to emit a laser beam;
a beam splitter configured to split the laser beam emitted from the light source into a signal beam and a reference beam;
a first objective lens configured to focus the signal beam onto a measurement target to irradiate the measurement target with the signal beam;
a focus position moving unit configured to move a focus position of the signal beam;
a defocus aberration adjustment unit configured to adjust a defocus aberration of the reference beam;
interference optics configured to receive a combined beam which is a combination of the signal beam reflected or scattered by the measurement target and the reference beam, and to generate three or more interference beams with different phases from the combined beam;

a plurality of photodetectors configured to detect the interference beams;

a processor programmed to generate a plurality of images on the basis of output signals of the photodetectors and apply image processing to the generated images, wherein the processor is further programmed to generate a third image by performing at least a subtraction process between a first image and a second image of the plurality of images, the first image having been generated when not providing the defocus aberration to the reference beam, and the second image having been generated when providing the defocus aberration to the reference beam.

2. The optical image measuring apparatus according to claim 1, wherein the third image is generated by subtracting the second image with adjusted luminance from the first image.

3. The optical image measuring apparatus according to claim 1, wherein the defocus aberration adjustment unit includes:

a second objective lens that is a same type of objective lens as the first objective lens that focuses the signal beam;

a reflecting mirror; and an actuator configured to change a relative distance between the second objective lens and the reflecting mirror.

4. The optical image measuring apparatus according to claim 3, wherein the defocus aberration adjustment unit further includes a flat plate between the second objective lens and the reflecting mirror, and wherein the flat plate has a same material and a same thickness as a portion, which transmits the signal beam, of a container that holds the measurement target.

5. The optical image measuring apparatus according to claim 1, further comprising:

a beam splitter configured to split the reference beam into a first reference beam and a second reference beam, the first reference beam not passing through the defocus aberration adjustment unit and the second reference beam passing through the defocus aberration adjustment unit, wherein the interference optics include first interference optics and second interference optics, the first interference optics are configured to generate first interference beams from a first combined beam which is a combination of the signal beam reflected or scattered by the measurement target and the first reference beam, and the second interference optics are configured to generate second interference beams from a second combined beam which is a combination of the signal beam reflected or scatted by the measurement target and the second reference beam, wherein the first image is generated using the first interference beams of the first interference optics, and wherein the second image is generated using the interference beams of the second interference optics.

6. The optical image measuring apparatus according to claim 1, wherein the first objective lens has a numerical aperture of greater than or equal to 0.4.

7. The optical image measuring apparatus according to claim 1, wherein wherein the interference optics generate four interference beams, wherein an interference phase of the signal beam and the reference beam of each of the four interference beams differs from one another by an integral multiple of approximately 90°, and wherein different pairs of the interference beams are detected by each one of the photodetectors, and each respective pair of the interference beams has a difference of approximately 180° in the interference phase of the signal beam and the reference beam thereof.

8. An optical image measuring apparatus comprising:

a light source configured to emit a laser beam;

a beam splitter configured to split the laser beam emitted from the light source into a signal beam and a reference beam;

a first objective lens configured to focus the signal beam onto a measurement target to irradiate the measurement target with the signal beam;

a focus position moving unit configured to move a focus position of the signal beam;

a defocus aberration adjustment unit which includes a second objective lens and a reflector and which is configured to adjust a defocus aberration of the reference beam by changing a relative position between the second objective lens and the reflector;

interference optics configured to receive a combined beam which is a combination of the signal beam reflected or scattered by the measurement target and the reference beam, and to generate three or more interference beams with different phases from the combined beam;

a plurality of photodetectors configured to detect the interference beams;

a processor programmed to generate a plurality of images on the basis of output signals of the photodetectors and apply image processing to the generated images, wherein the processor is further programmed to generate a third image by performing at least a subtraction process between a first image and a second image of the plurality of images, the first image having been generated when not providing the defocus aberration to the reference beam, and the second image having been generated when providing the defocus aberration to the reference beam.

* * * * *